(12) United States Patent
Kato

(10) Patent No.: US 6,672,562 B2
(45) Date of Patent: Jan. 6, 2004

(54) ELECTROMAGNETIC FLUID CONTROL VALVE

(75) Inventor: Yasuo Kato, Aichi-ken (JP)

(73) Assignee: Denso Corporation, Kariya (JP)

( * ) Notice: Subject to any disclaimer, the term of this patent is extended or adjusted under 35 U.S.C. 154(b) by 77 days.

(21) Appl. No.: 10/060,375

(22) Filed: Feb. 1, 2002

(65) Prior Publication Data

US 2002/0104979 A1 Aug. 8, 2002

(51) Int. Cl.[7] .............................................. F16K 31/10
(52) U.S. Cl. ................................. 251/129.17; 251/284
(58) Field of Search ........................ 251/129.02, 129.15, 251/129.17, 284, 335.2

(56) References Cited

U.S. PATENT DOCUMENTS

| 774,985 | A | * | 11/1904 | Jones | 251/273 |
| 4,644,969 | A | * | 2/1987 | Watanabe | 137/625.27 |
| 6,295,975 | B1 | * | 10/2001 | Yew et al. | 123/568.2 |
| 6,581,904 | B2 | * | 6/2003 | Watanabe et al. | 251/129.17 |

FOREIGN PATENT DOCUMENTS

| JP | 7-233882 | 9/1995 |
| JP | 8-312827 | 11/1996 |
| JP | 2001-200948 A | 7/2001 |

* cited by examiner

*Primary Examiner*—Gene Mancene
*Assistant Examiner*—Patrick Buechner
(74) *Attorney, Agent, or Firm*—Nixon & Vanderhye P.C.

(57) ABSTRACT

A retainer is coupled around a shaft of an electromagnetic fluid control valve. A first projection is provided at one axial end of the retainer. A second projection is provided at the other axial end of the retainer. A central portion of a valve member is sandwiched between a flat surface of the first projection and a washer. A central portion of a diaphragm is sandwiched between a flat surface of the second projection and an end surface of a moving core 4.

17 Claims, 6 Drawing Sheets

ELECTROMAGNETIC FLUID CONTROL VALVE

BACKGROUND OF THE INVENTION

The present invention relates to an electromagnetic fluid valve used for controlling fluid such as air, and more particularly to an electromagnetic fluid control valve used for selectively opening or closing a controlled fluid (air) pipe of a canister constituting an evaporated fuel purge system which is usually associated with a fuel tank of an automotive vehicle.

Unexamined published Japanese patent application No. 7-233882 discloses an electromagnetic fluid control valve comprising a controlled fluid passage, a solenoid coil (i.e., an electromagnetic actuator), and a diaphragm partitioning the controlled fluid passage and the solenoid coil. The diaphragm, having a constant film thickness, is disposed between an axial end of a movable member and a coil retaining member.

More specifically, according to the valve arrangement disclosed in the unexamined published Japanese patent application No. 7-233882, the solenoid valve selectively blocks and unlocks communication between a first passage and a second passage. The solenoid valve includes a stationary iron core, a first movable member, and a second movable member. The stationary iron core is magnetized when a coil is energized. The second movable member is made of a permanent magnet. The magnetic poles of the permanent magnet are arranged in such a manner that the permanent magnet repels the stationary iron core when the coil is energized. As the second movable member moves, the first movable member comes into contact with a valve seat defining a portion of the second passage. When the first movable member is in contact with the valve seat, communication between the first passage and the second passage is blocked.

An operation chamber extends between the first movable member and the second movable member. The first movable member includes a valve member and an annular diaphragm. The annular diaphragm extends radially outward from the valve member. Thus, the inner circumferential edge of the diaphragm is connected with the valve member. The outer circumferential edge of the diaphragm is connected with a coil hold member. The valve member is movably supported by the diaphragm. The valve member has a first through hole for providing communication between the operation chamber and the second passage. The diaphragm has a second through hole for providing communication between the operation chamber and the first passage. When the valve member departs from the valve seat, the operation chamber and the second passage communicate with each other via the first through hole. When the valve member is in contact with the valve seat, the first through hole is closed by the second movable member so that the operation chamber and the second passage are disconnected from each other. On the other hand, the operation chamber and the first passage remain in communication with each other via the second through hole regardless of condition of the valve member which departs from or contacts to the valve seat.

Unexamined published Japanese patent application No. 8-312827 discloses an electromagnetic fluid control valve including a coil, a moving core, and a yoke. A coil hold member supports the coil. The moving core moves as the coil is energized and de-energized. The yoke has a valve portion formed with a communication hole and a valve seat around the communication hole. A valve rubber is mounted on the moving core. When the coil is de-energized, the moving core is positioned by a return spring so that the valve rubber is separate from the valve seat. Thus, in this case, the communication hole is unblocked. When the coil is energized, the moving core moves toward the valve portion of the yoke and the valve rubber comes into contact with the valve seat. Thus, in this case, the communication hole is blocked. The moving core has a cylindrical portion extending into a central bore of the coil hole member.

However, according to the former electromagnetic fluid control valve, the diaphragm having a constant film thickness isolates the electromagnetic actuator from the controlled fluid passage. Thus, it becomes possible to prevent water or other foreign substances contained in the controlled fluid from entering into the electromagnetic actuator. However, when the first movable member operates, there is a tendency that the first movable member itself may incline with respect to its operating direction. Such an inclined movement of the first movable member leads to leakage of controlled fluid in the closed state of the valve.

Furthermore, according to the latter electromagnetic fluid control valve, a shaft is supported at only one end by the coil hold member serving as bearing portion of the moving core. The shaft easily inclines with respect to the its operating direction. When the shaft inclines, the valve attached to the front end of this shaft contacts with a sheet in an inclined manner. This will lead to the leakage of controlled fluid. Furthermore, when the moving core operates, the sheet rubber provided in the moving core is brought into contact with the bottom of the yoke and causes noise sound.

SUMMARY OF THE INVENTION

To solve the above problems, the present invention has an object to provide an electromagnetic fluid control valve capable of providing excellent sealing between the shaft and the valve member as well as excellent sealing between the shaft and the diaphragm.

Furthermore, the present invention has an object to provide an electromagnetic fluid control valve which provides a simplified shaft arrangement.

Moreover, the present invention has an object to provide an electromagnetic fluid control valve which is capable of improving the assembling works and realizing cost reduction.

In order to accomplish the above and other related objects, the present invention provides an electromagnetic fluid control valve comprising an electromagnetic actuator having a movable member slidable in an axial direction of the electromagnetic fluid control valve. A valve body has an accommodation chamber storing the electromagnetic actuator therein, a fluid passage in which fluid flows, and a valve opening formed in an appropriate portion of the fluid passage. A diaphragm airtightly separates an inside space of the valve body into the fluid passage and the accommodation chamber. A shaft extends in the axial direction through the valve opening and is integrally shiftable with the movable member in the axial direction. The shaft has a flange at one axial end thereof which is capable of passing through the valve opening. A valve member is coupled around the shaft at one axial end for closing the valve opening when the valve member is brought into contact with a valve seat formed around the valve opening and for opening the valve opening when the valve member lifts off the valve seat. A retainer is coupled around the shaft at a portion axially offset from the valve member. The retainer is capable of passing through the valve opening. A first retaining portion is provided at one axial end of the retainer, with the valve member sandwiched between the flange of the shaft and the first retaining portion of the retainer. And, a second retaining portion is provided at the other axial end of the retainer, with the diaphragm sandwiched between the movable member of the electromagnetic actuator and the second retaining portion of the retainer.

According to a preferred embodiment of the present invention, it is preferable that the valve member has at least one ring-shaped projected portion provided on an end surface thereof, and the ring-shaped projected portion is deformed when a pressing force is applied between the flange of the shaft and the first retaining portion of the retainer.

Furthermore, it is preferable that at least one ring-shaped projected portion is provided on both end surfaces of the valve member. The valve member has two circular ridges as at least one ring-shaped projected portion.

Furthermore, it is preferable that the valve body has a stopper for restricting an excessive shift movement of the shaft in the axial direction when the electromagnetic valve is in an opened state.

Furthermore, it is preferable that the stopper is formed on a partition wall protruding radially inward from a tubular wall of the valve body for separating the fluid passage into two passages.

Furthermore, it is preferable that an inner circular edge of the partition wall defines the valve opening.

Furthermore, it is preferable that the retainer has a central projection formed between the first retaining portion and the second retaining portion, and the central projection is brought into contact with the stopper of the valve body when the electromagnetic valve is in an opened state.

Furthermore, it is preferable that the central projection of the retainer includes a plurality of legs extending in radially outward directions from a main body of the retainer.

Furthermore, it is preferable that the first retaining portion has a flat surface extending perpendicularly to the axial direction for providing surface contact between the valve member and the retainer.

Furthermore, it is preferable that the second retaining portion has a flat surface extending perpendicularly to the axial direction for providing surface contact between the diaphragm and the retainer.

Furthermore, it is preferable that the electromagnetic fluid control valve further comprises a communication passage for providing connection between the accommodation chamber and the outside of the valve body.

Furthermore, it is preferable that the communication passage includes an orifice which substantially restricts a flow rate of fluid in the communication passage.

Furthermore, it is preferable that the diaphragm has a central portion and an easily deformable portion extending around the central portion, and the central portion has a higher rigidity than the easily deformable portion.

Furthermore, it is preferable that the central portion of the diaphragm is coupled around the solenoid shaft.

Furthermore, it is preferable that the central portion of the diaphragm is thicker than the easily deformable portion extending around the central portion.

Moreover, the present invention provides a method for assembling the above-described electromagnetic fluid control valve. The assembling method comprises a first step of coupling the valve member around one axial end of the shaft by inserting the other axial end of the shaft into an engagement hole of the valve member, a second step of combining the valve body with the shaft by inserting the other axial end of the shaft into the valve opening of the valve body so that the shaft extends through the valve opening of the valve body, a third step of coupling the retainer around the shaft by inserting the other axial end of the shaft into an engagement hole of the retainer, a fourth step of coupling the diaphragm around the shaft by inserting the other axial end of the shaft into an engagement hole of the diaphragm, and a fifth step of coupling the movable member of the electromagnetic actuator around the other axial end of the shaft by inserting the other axial end of the shaft into an engagement hole of the movable member.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

Previously Proposed Electromagnetic Fluid Control Valve

The applicant has already proposed an electromagnetic fluid control valve (refer to U.S. patent application Ser. No. 09/779,441) which is not opened to the public.

Figure 7:
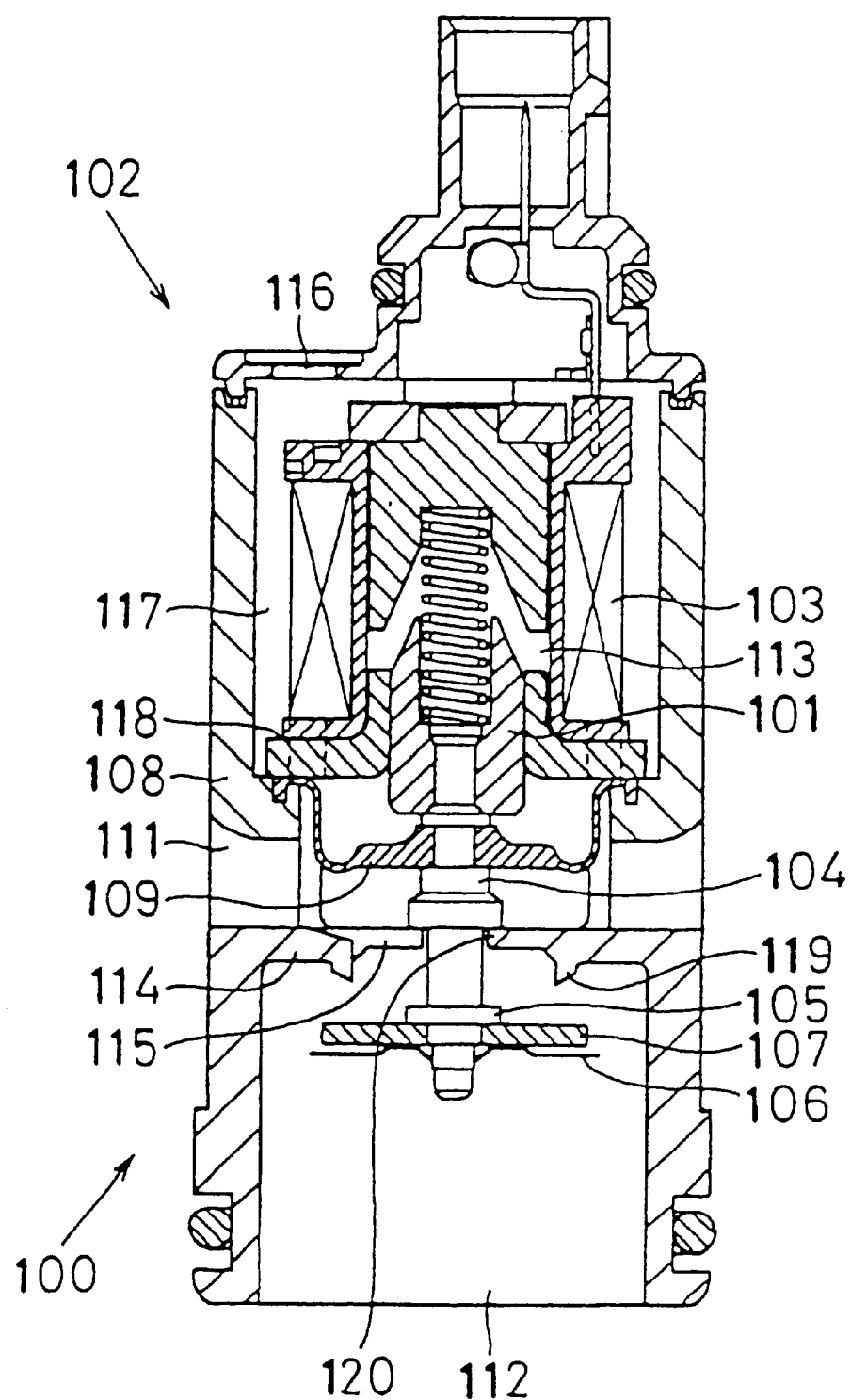
FIG. 7 is a cross-sectional view showing an electromagnetic valve previously proposed by the applicant.

FIG. 7 shows a proposed electromagnetic fluid control valve 100 which includes an electromagnetic actuator 102 having a moving core 101, a shaft 104 shiftable in an axial direction (i.e. an up-and-down direction in the drawing) together with the moving core 101 when a magnetomotive force is generated by a solenoid coil 103, a ring-shaped flange 105 formed at a front axial end of the shaft 104, a valve member 107 sandwiched between the flange 105 and a washer 106, and a diaphragm 109 interposed between the shaft 104 and a valve body 108.

The diaphragm 109 airtightly divides or separates the inside space of valve body 108 into a controlled fluid chamber and an accommodation chamber 113. A partition wall 114 divides or separates the controlled fluid chamber into a first controlled fluid chamber 111 and a second controlled fluid chamber 112. The shaft 104 extends through a valve opening 115 formed at the center of partition wall 114.

The electromagnetic fluid control valve 100 further includes a fluid passage 117 which extend from the inside of accommodation chamber 113 via an air hole 116 to the outside of accommodation chamber 113. The fluid passage 117 is equipped with a stationary orifice 118 where the effective cross-sectional area of the passage is reduced so as to restrict the flow rate of controlled fluid flowing from the inside to the outside of the accommodation chamber 113 or vice versa. The diaphragm 109 has a central portion which is not elastically deformed. This rigid central portion prevents the generation of noise sound when the valve member 107 is brought into contact with a ring-shaped valve seat 119 formed along the valve opening 115 of the partition wall 114.

Furthermore, a shaft bearing 120, provided in the valve opening 115 of the partition wall 114, prevents the shaft 104 from inclining with respect to the axial direction. As the valve member 107 can be accurately seated on the valve seat 119, it becomes possible to surely prevent the fluid leakage at the valve seat 119. However, according to the electromagnetic fluid control valve 100, the shaft 104 has a complicated shape. It was difficult to ensure the sealing between the valve member 107 and the shaft 104 as well as the sealing between the diaphragm 109 and the shaft 104.

Preferred Embodiment

Thus, the present invention provides an electromagnetic fluid control valve capable of providing excellent sealing between the shaft and the valve member as well as excellent sealing between the shaft and the diaphragm.

Furthermore, the present invention provides an electromagnetic fluid control valve which provides a simplified shaft arrangement while improving the assembling works and realizing cost reduction.

A preferred embodiment of the present invention will be explained hereinafter with reference to attached drawings.

Figure 2:
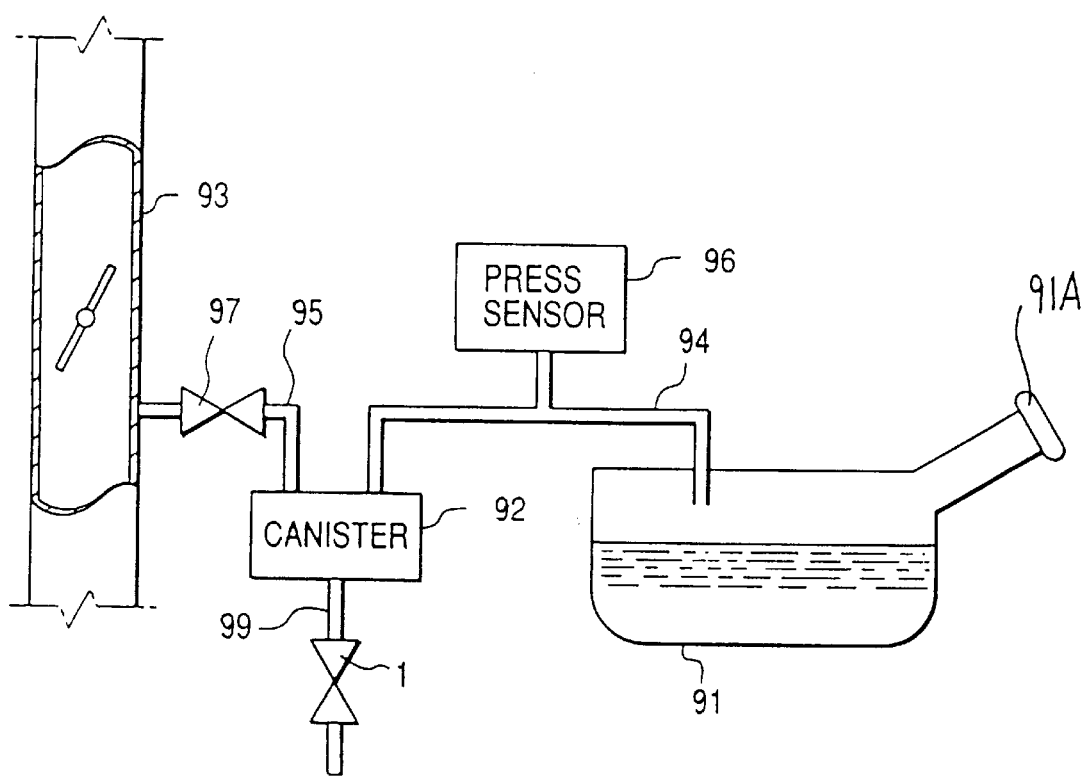
FIG. 2 is a schematic diagram showing an evaporated fuel purge system in accordance with the preferred embodiment of the present invention.

FIG. 2 shows an evaporated fuel purge system associated with a fuel tank 91 of an automotive vehicle. The evaporated fuel purge system includes a canister 92 filled with adsorbent such as activated charcoal. A pipe 94 connects an upper space of the fuel tank 91 to the canister 92. The pipe 94 provides a passage for evaporated fuel entering into the canister 92. A pipe 95 connects the canister 92 to a portion downstream of a throttle valve in an engine intake passage 93.

Evaporated fuel, i.e., fuel vapor, is guided from the fuel tank 91 to the canister 92 via the pipe 94 and then adsorbed by the adsorbent placed in the canister 92. A significant negative pressure develops in the engine intake passage, especially at the portion downstream of the throttle valve. Due to such a negative pressure caused at the portion downstream of the throttle valve, fuel vapor is released from the canister 92 and drawn into the engine intake passage 93 via the pipe 95, if a later-described purge valve 97 is opened. Thus, purging of fuel vapor is implemented. The evaporated fuel purge system prevents fuel vapor from being released into the air, thereby suppressing the air pollution.

A pressure sensor 96 is connected to an intermediate portion of pipe 94. A purge valve 97 is provided in the pipe 95 connecting the canister 92 to the engine intake passage 93. A pipe 99 extending from the canister 92 opens into the air (i.e., the atmosphere).

The evaporated fuel purge system further includes an electromagnetic valve (i.e., solenoid valve) 1 according to a preferred embodiment of the present invention. The solenoid valve 1 is provided in the pipe 99 connecting the canister 92 to the air. The solenoid valve 1 selectively opens and closes the pipe 99. When the pipe 99 is opened by the solenoid valve 1, the outside fresh air can enter into the canister 92 via the pipe 99. When the pipe 99 is closed by the solenoid valve 1, no air is introduced into the canister 92 from the outside.

During a low-load engine operating condition, intake air introduced into an engine combustion chamber is reduced by choking the throttle with a smaller throttle opening degree. In such a low-load engine operating condition, a significant negative pressure develops at a portion downstream of the throttle valve in the engine intake passage 93. In this condition, the evaporated fuel purge system implements a check on the leak of fuel vapor in the following manner.

First, the pipe 99 is closed by the solenoid valve 1. Then, the purge valve 97 opens. All of the pipes 94 and 95 and the canister 92 are subjected to a negative pressure developed in the engine intake passage 93. Fuel vapor temporarily stored in the canister 92 is released into the intake passage and then burned in the engine combustion chamber as part of fuel mixture. Subsequently, the purge valve 97 is closed. After a predetermined time has passed since the closure time of purge valve 97, a measurement is performed to check whether or not a pressure rise is detected by the pressure sensor 96. A decision is made as to leak of fuel vapor on the basis of the result of the measurement.

Figure 1:
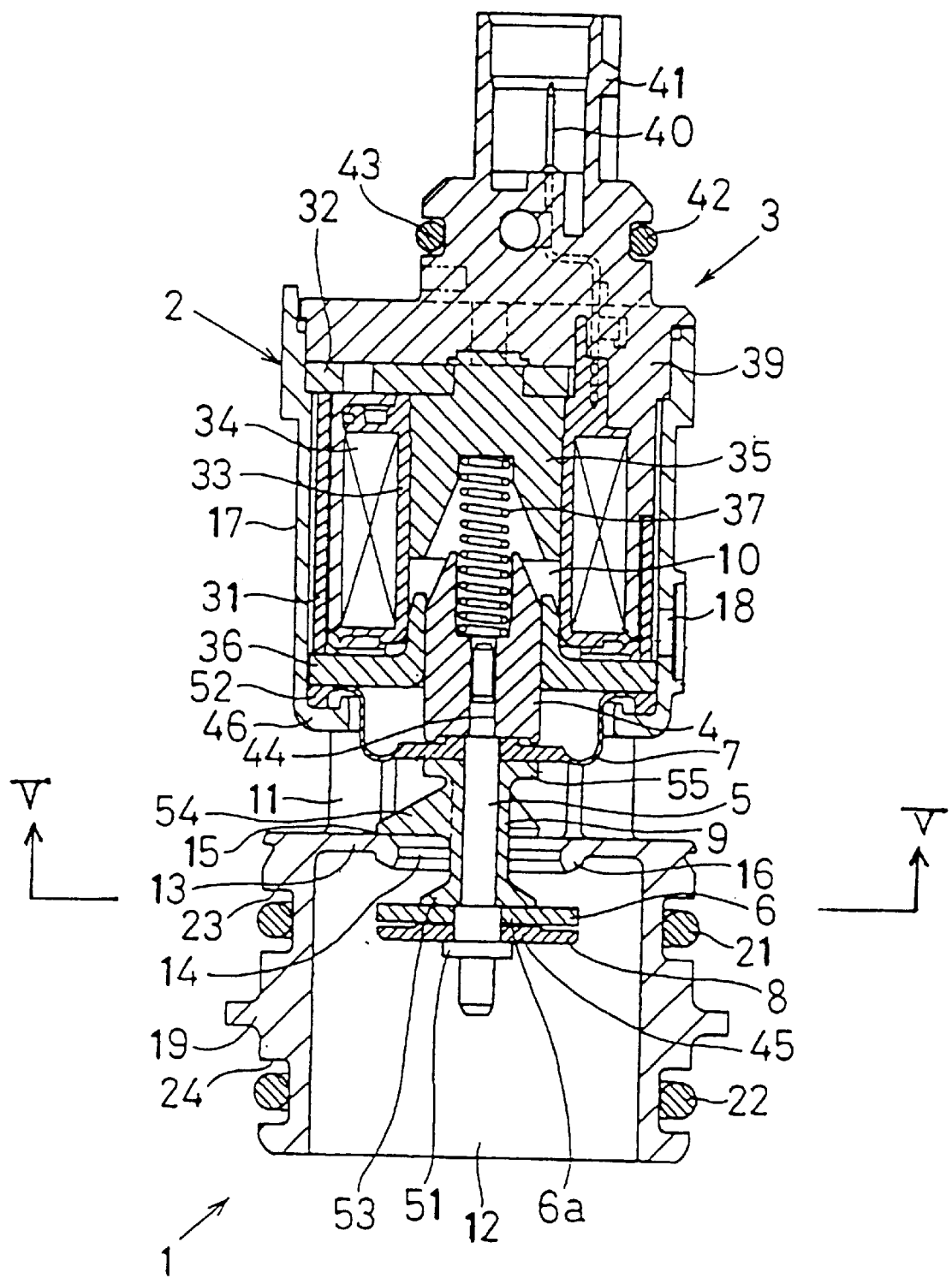
FIG. 1 is a vertical cross-sectional view showing an electromagnetic valve in accordance with a preferred embodiment of the present invention.
Figure 4:
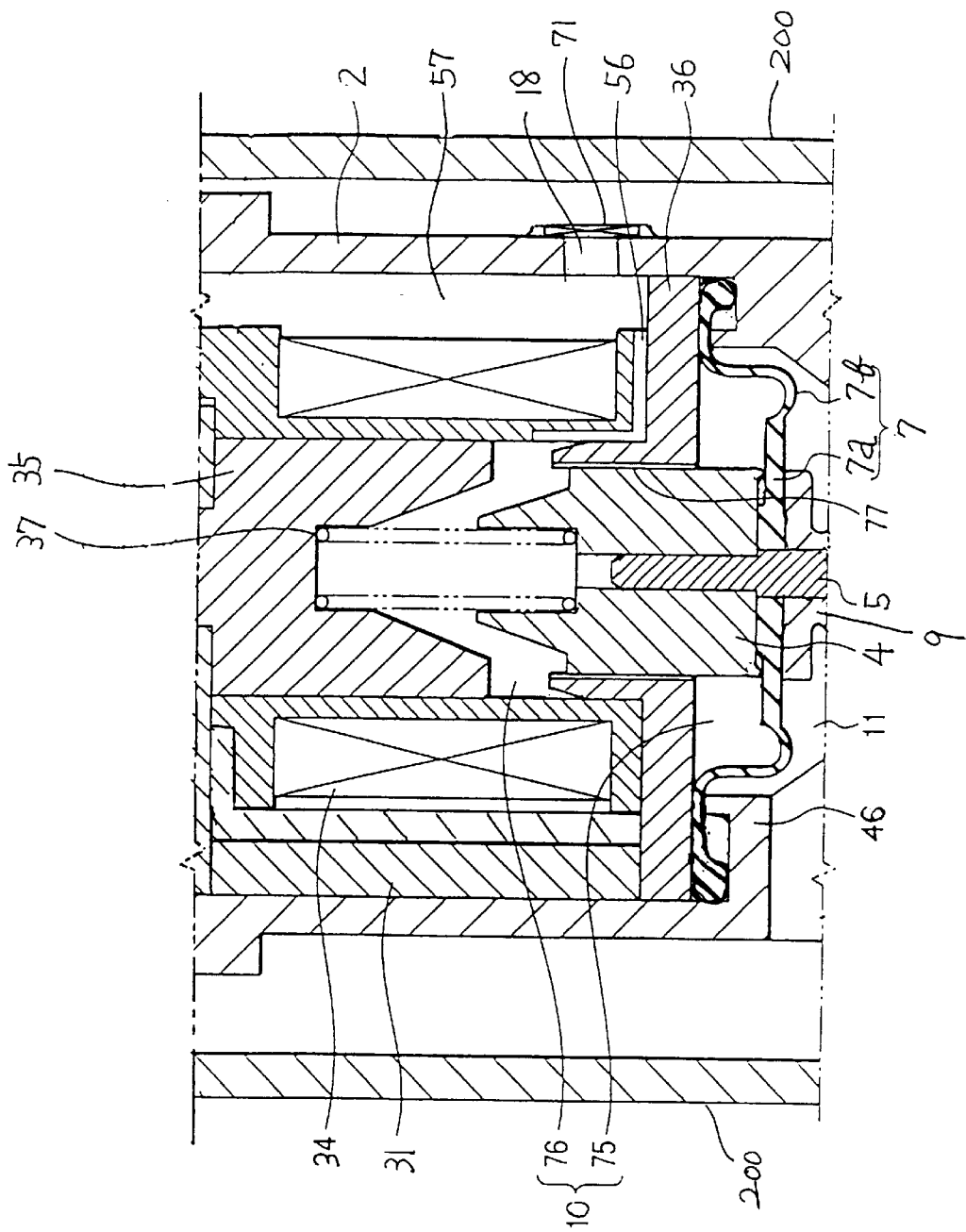
FIG. 4 is a vertical cross-sectional view enlargedly showing part of the electromagnetic valve shown in FIG. 1.

FIGS. 1 and 4 show the solenoid valve 1.

In the following explanation of the solenoid valve 1, a direction referred to as "front" is identical with a direction referred to as "lower" and a direction referred to as "rear" is identical with a direction referred to as "upper" due to the illustration of FIG. 1 wherein the shaft of solenoid valve 1 is directed downward.

The solenoid valve 1 is of a normally open type. The solenoid valve 1 includes a housing 200 (refer to FIG. 4) in which a tubular or cylindrical valve body 2 is fixedly disposed so that a controlled fluid (controlled air) passage extends between the housing 200 and the valve body 2. An electromagnetic drive unit 3 including a solenoid coil 34 is located in the valve body 2. As will be made clear later, a solenoid shaft 5 is axially moved by the electromagnetic drive unit 3. A disk-shaped valve member 6 is coaxially mounted on an axial end (i.e., a front or distal end) of the solenoid shaft 5. The valve member 6 extends perpendicularly to the axis of the solenoid shaft 5. The valve member 6 moves together with the solenoid shaft 5. A diaphragm 7 is installed at the other axial end (i.e., a rear or proximal end) of the solenoid shaft 5. The diaphragm 7 extends radially outward or transversely from the solenoid shaft 5 to the valve body 2. The diaphragm 7 airtightly separates or divides the inside space of valve body 2 into two, upper and lower, parts adjacent to each other via the transversely extending diaphragm 7. An easily deformable portion of diaphragm 7 is governed by a pressure balance between the neighboring two chambers. The electromagnetic drive unit 3 is positioned above the diaphragm 7 and in thus located in the upper chamber of the diaphragm 7. The lower chamber of diaphragm 7 is part of a controlled fluid passage.

A retainer 9 is mounted on or coupled around an axially intermediate portion of the solenoid shaft 5. The retainer 9 has a cylindrical body extending in the axial direction of the solenoid shaft 5. The retainer 9 spans from the valve member 6 to the diaphragm 7.

The valve body 2 is made of an electrically-insulating resin. The electromagnetic drive unit 3 is placed in an accommodation chamber 10 (corresponding to the upper chamber of the diaphragm 7) defined in the upper part of valve body 2. Furthermore, the valve body 2 has a partition wall 13 at an axially mid position for separating or dividing the controlled fluid (i.e., air) passage into a first fluid passage 11 and a second fluid passage 12. The partition wall 13 projects radially inward from a cylindrical wall of valve body 2. The inner circular edge or periphery of partition wall 13 defines a valve opening 14. The valve opening 14 is provided at the center of the partition wall 13. The first fluid passage 11 and the second fluid passage 12 communicate with each other via the valve opening 14, when the solenoid valve 1 is in its opened state. In this respect, the valve opening 14 forms part of the controlled fluid passage. When the solenoid valve 1 is in its closed state, the first fluid passage 11 and the second fluid passage 12 are isolated from each other by the valve member 6 closing the valve opening 14. The valve member 6 blocks the communication between the first fluid passage 11 and the second fluid passage 12. The valve opening 14 has an inner diameter of, for example, 4.2 mm. The first fluid passage 11 extends in a direction normal to the axis of solenoid shaft 5, i.e., in a direction parallel to the valve member 6. The second fluid passage 12 extends in the axial direction of solenoid shaft 5, i.e., in a direction normal to the valve member 6.

A front axial end of retainer 9 meets a stopper 15 formed on an upper (i.e., rear) end of the partition wall 13. The retainer 9 is brought into contact with the stopper 15 when the electromagnetic valve is in its opened state (i.e., when the valve is shifted downward).

The inner circular ridge of the partition wall 13 has a ring-shaped projection protruding in the axial direction of the valve body 2. This ring-shaped projection forms a valve seat 16. The valve seat 16 encircles the entire circumferential periphery of the valve opening 14. In this respect, the valve seat 16 is a circular ridge protruding downward (forward) from the partition wall 13 along the entire periphery of the valve opening 14. The height (i.e., the axial dimension) of valve seat 16 is equal to, for example, 2 mm. The circular wall of valve seat 16 has a thickness of, for example, 1.5 mm. The front (or distal) end of valve seat 16 is tapered. In other words, the valve seat 16 has a radial cross section which is configured into a tapered shape. The valve member 6 contacts the valve seat 16, when the solenoid valve 1 is in its closed state (i.e., the valve member 6 is raised upward). The inner effective diameter of circular valve seat 16 gradually increases as a portion approaches the lower (i.e., front or distal) edge. It is preferable that a cushion rubber or a rubber-based resilient member covers the valve seat 16.

The valve body 2 has an engagement wall 46 which projects radially inward from the cylindrical wall of the valve body 2. The engagement wall 46 supports the outer circumferential edge of the diaphragm 7.

The valve body 2 includes a first tubular member 17 defining the accommodation chamber 10 therein. The first tubular member 17 has an air hole 18 formed at its lower end. The air hole 18 provides communication between the accommodation chamber 10 and the outside of first tubular member 17. A water-repellant filter 71 covers the air hole 18 (refer to FIG. 4). The water-repellant filter 71 prevents water or other foreign substances from entering in the accommodation chamber 10. Air can pass through the water-repellant filter 71.

The valve body 2 has a second tubular member 19 defining the second fluid passage 12 therein. The lower end opening of second tubular member 19 is connected to the pipe 99 of the canister 92. The second tubular member 19 has circular ring grooves 23 and 24 formed on an outer cylindrical surface thereof. Seal members 21 and 22, such as O-rings, are fitted or placed in these grooves 23 and 24. Each of seal members 21 and 22 airtightly seals the clearance between an inner wall of pipe 99 and an outer surface of the second tubular member 19.

The electromagnetic drive unit 3 is an electromagnetic actuator which drives a moving core 4 and the solenoid shaft 5 in the axial direction (i.e., in the up-and-down direction in FIG. 1). A yoke 31 is disposed in the accommodation chamber 10 along an inner wall of the first tubular member 17. The yoke 31 is made of a magnetic material such as a steel plate. Another yoke 32, configured into a disk or platelike shape, is disposed adjacently to the yoke 31 at an upper axial end of the first tubular member 17. The yoke 32 is made of a magnetic material such as a steel plate.

A coil bobbin 33 is disposed radially inside the yoke 31. The solenoid coil 34 is wound around an outer cylindrical wall of coil bobbin 33. A stator core (i.e., stationary iron core) 35 is disposed radially inside the coil bobbin 33 at the center of the electromagnetic drive unit 3. The stator core 35 has a cylindrical body extending in the axial direction of the valve body 2. The stator core 35 has an axially extending conical recess formed at the lower end thereof. The stator core 35 is associated with a moving core (i.e., a movable member) 4. The moving core 4 is spaced from the stator core 35 in the axial direction, with a clearance for allowing the moving core 4 to move between a predetermined uppermost position and a predetermined lowermost position. The moving core 4 is magnetically attracted or drawn toward the stator core 35 when a magnetomotive force is generated by the solenoid coil 34. The moving core 4 moves together with the solenoid shaft 5.

The solenoid coil 34 has turns provided on the outer cylindrical wall (i.e., outer circumferential surface) of coil bobbin 33. Both ends of solenoid coil 34 are electrically connected to the power supply via terminals 40. The coil bobbin 33 is made of an electrically-insulating material. The stator core 35 has an upper projection which is fitted into a hole of the yoke 32 by a pressing force. Thus, the stator core 35 and the yoke 32 are fixed to each other.

A plate magnetic 36, forming part of a magnetic circuit, is disposed adjacently to the yoke 31 at another axial end (i.e., a lower end) of the first tubular member 17. The yoke 31 is held between the yoke 32 and the plate magnetic 36. The stator core 35, the yoke 31, the yoke 32, the plate magnet 36, and the moving core 4 cooperatively form a magnetic circuit. The plate magnetic 36 has an axial bore formed at the center thereof which slidably guides the moving core 4 in the axial direction. A return spring 37, e.g., a coil spring having a helical shape, is interposed between an axially extending conical recess of stator core 35 and a mating tapered projected end of the moving core 4. The return spring 37 resiliently urges the moving core 4 downward. Namely, the return spring 37 urges the moving core 4 relative to the stator core 35 toward a position corresponding to the opened state of the solenoid valve 1.

The moving core 4 is integrated with the solenoid shaft 5. When the stator core 35 is shifted downward by the resilient force of the return spring 37, the valve member 6 shifts downward and opens the fluid passage. The first fluid passage 11 communicates with the second fluid passage 12 via the valve opening 14.

The coil bobbin 33 is, for example, a cylindrical resin molded product. An electric wire of solenoid coil 34 is repetitively wound on the outer cylindrical surface of coil bobbin 33 so as to provide a predetermined number of coil turns around the bobbin 33. The solenoid coil 34 generates a magnetomotive force in response to supply of electric power, and draws or attracts the moving core 4 against the resilient force of the return spring 37.

A resin molded member 39 is provided around the solenoid coil 34. An axial end (i.e., an upper end) of the resin molded member 39 protrudes in the axial direction from an axial upper end of the first tubular member 17. A connector 41 is integrally formed with the axially protruding portion of the resin molded member 39. A pair of terminals 40, insert molded in a recess of the connector 41, provide electric connect between the solenoid coil 34 and a battery (not shown) installed on an automotive vehicle. A circular ring groove 43 is formed on an outer cylindrical surface of the axially protruding portion of the resin molded member 39. An O-ring 42, fitted or placed in the circular ring groove 43, airtightly seals the clearance between the inner cylindrical surface of the housing 200 and the axially protruding portion of the resin molded member 39.

The moving core 4 is slidable along a cylindrical surface of the axial bore formed at the center of the plate magnetic 36. The tapered projected end of moving core 4 is an axially extending conical projection which is drawn upward when the solenoid coil 34 produces a magnetomotive force. The tapered projected end of moving core 4 is received by the axially extending conical recess of the stator core 35. The moving core 4 has an axial through hole 44 at the center thereof so as to extend in the axial direction. A rear end (i.e., upper axial end) of solenoid shaft 5 is fixed in the through hole 44. The diaphragm 7 has a flat central portion 7a which extends perpendicularly to the axis of the solenoid shaft 5. The flat central portion 7a is brought into contact with the front end surface of the moving core 4 (refer to FIG. 4).

The plate magnetic 36 has a cylindrical portion extending axially with respect to the first tubular member 17, and an annular portion (i.e., a flange portion) extending radially outward from a lower end of the cylindrical portion. The annular portion (the flange portion) of the plate magnetic 52 is placed between the lower end of the yoke 31 and the engagement wall 46 of the first tubular member 17. The moving core 4 slidably extends into the axial bore formed in the cylindrical portion of the plate magnetic 36. The moving core 4 is movably supported by the plate magnetic 36. The moving core 4 is thus positioned so as to extend in the axial direction.

The return spring 37 resiliently urges the axially movable members, such as solenoid shaft 5, valve member 6, diaphragm 7 and moving core 4, downward so as to open that the electromagnetic valve, i.e., toward a position corresponding to the opened state of the solenoid valve 1. The return spring 37 is provided between the stator core 35 and the moving core 4. An upper axial end of the return spring 37 is supported in the recess of the stator core 35. A lower axial end of the return spring 37 is supported in a bore provided in the center of moving core 4.

The solenoid shaft 5 is made of a resin. The solenoid shaft 5 extends through the valve opening 14. Furthermore, the solenoid shaft 5 extends in the axial direction of the valve body 2. The solenoid shaft 5 is axially movable. Namely, the solenoid shaft 5 is shiftable in the axial direction within an open area of the valve opening 14. The solenoid shaft 5 has a front end (i.e., a lower end) protruding into the second fluid passage 12 at a portion lower than the valve seat 16. A portion of the solenoid shaft 5 in and near the valve opening 14 has an outer diameter of, for example, 4 mm.

A flange 51, formed around a front axial end of solenoid shaft 5, fixedly holds a circular disk-shaped washer 8. The flange 51 has an appropriate shape for securely hold or support the washer 8. The rear end of solenoid shaft 5 is press-fitted or inserted into an axial through hole 44 of moving core 4. For example, the rear end of solenoid shaft 5 is fixed to the moving core 4 through a thermally deforming process. Thus, the solenoid shaft 5 is firmly fixed with the moving core 4. For example, the flange 51 has an outer diameter of, for example, 7 mm.

Figure 3A:
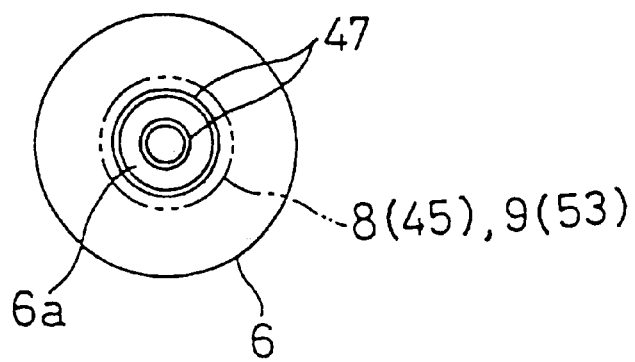
FIG. 3A is a plan view showing a front end surface of a valve member adopted in the electromagnetic valve in accordance with the preferred embodiment of the present invention.
Figure 3B:
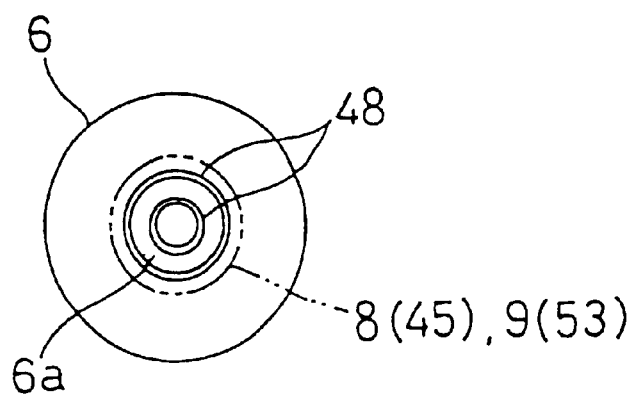
FIG. 3B is a plan view showing a rear end surface of the valve member adopted in the electromagnetic valve in accordance with the preferred embodiment of the present invention.

The valve member 6, as shown in FIGS. 1, 3A and 3B, is a rubber-based resilient member such as HNBR (hydrogen added nitrile-butadiene rubber) having excellent resistance against gasoline. HNBR is better than NBR in heat-resisting performance. The valve member 6 is basically of a disk shape and is coaxial with the solenoid shaft 5. The valve member 6 extends transversely or perpendicularly from the lower axial end of solenoid shaft 5. The valve member 6 axially shifts together with the solenoid shaft 5 in the second fluid passage 12. When the solenoid valve 1 is in its closed state, the valve member 6 contacts the valve seat 16 and hence closes the valve opening 14. The valve member 6 has a circular portion 6a at the center thereof. The circular central portion 6a is sandwiched or firmly held between a thickened portion 45 of washer 8 and a first projection 53 of retainer 9. The thickened portion 45 of washer 8 has an axial hole which is just fitted with the front axial part of the solenoid shaft 5 adjacent to the flange 51. The thickened portion 45 of washer 8 in engagement with the solenoid shaft 5 protrudes axially upward and presses valve member 6 against the first projection 53 of retainer 9.

An outer circumferential portion of washer 8 is axially spaced from an outer circumferential portion of valve member 6 with a gap of a predetermined size (a predetermined thickness) which enables the valve member 6 to elastically deform and hence contact a complete circle of the valve seat 16 even if the valve member 6 tilts. As shown in FIG. 3A, the central portion 6a has two circular ridges 47 coaxially formed on a front surface thereof. As shown in FIG. 3B, the central portion 6a has two circular ridges 48 coaxially formed on a rear surface thereof. When the valve member 6 is pressed between the washer 8 and the retainer 9, the central portion 6a elastically deforms chiefly at the circular ridges 47 and 48. Thus, the circular ridges 47 and 48 serve as seal member.

The diaphragm 7 is a rubber-based resilient member such as NBR (nitrile-butadiene rubber). The diaphragm 7 is a fixed around the rear axial end of the solenoid shaft 5. The diaphragm 7 extends around the solenoid shaft 5. A radial inner portion of the diaphragm 7 is firmly held between the front axial (i.e., the lower) end of moving core 4 and the rear axial (i.e., upper) end of retainer 9. Thus, the diaphragm 7 is mounted on and can move together with the solenoid shaft 5. During the change of solenoid valve 1 to its closed state, the diaphragm 7 causes the valve member 6 to smoothly and gently land or contact on the valve seat 16 while adjusting the pressure balance between the first fluid passage 11 and accommodation chamber 10. When the solenoid valve 1 is changed to its opened state, the diaphragm 7 moves downward together with the solenoid shaft 5. The diaphragm 7 causes the valve member 6 to smoothly and gently depart from or lift off the valve seat 16. In this manner, within a predetermined axial stroke, the position of the main part of diaphragm 7 is governed by the state of electromagnetic valve 1.

The diaphragm 7 has a thinned or easily deformable portion 7b extending radially outward from the thickened central portion 7a (refer to FIG. 4). An outer circumferential edge 52 of diaphragm 7 is coupled with engagement wall 46. The engagement wall 46 is curled radially inward from the axial lower end of the first tubular member 17 and extends perpendicularly to the axial direction of the first tubular member 17. The outer circumferential edge 52 of diaphragm 7 is elastically deformable and is airtightly sandwiched between the flange portion of plate magnetic 36 and the engagement wall 46. The coil bobbin 33, when installed in the first tubular member 17, gives a pressing force to a behind side of the engagement wall 46. Thus, the outer circumferential edge 52 of diaphragm 7 is firmly held between the plate magnetic 36 and the engagement wall 46.

More specifically, the diaphragm 7 has the circular rigid central portion 7a with a thickened portion serving as seal member. The thickened portion is sandwiched or firmly held between a circular front end surface of moving core 4 and a circular rear end surface of a second projection 55 of retainer 9. The circular central portion 7a has a stepped-down portion around the centermost thickened portion. The stepped-down portion is slightly thinner than the centermost thickened portion and is sufficiently thicker than the thinned or easily deformable portion 7b extending radially outward from the rigid central portion 7a. Thus, the central portion 7a of diaphragm 7 has a higher rigidity than the thinned or easily deformable portion 7b of diaphragm 7. The rear (i.e., upper) end of solenoid shaft 5 is press-fitted into an axial hole opened across the rigid central portion 7a (i.e., thickened portion) under a pressing force. Accordingly, the rear end of solenoid shaft 5 is securely fixed with the diaphragm 7.

Figure 5:
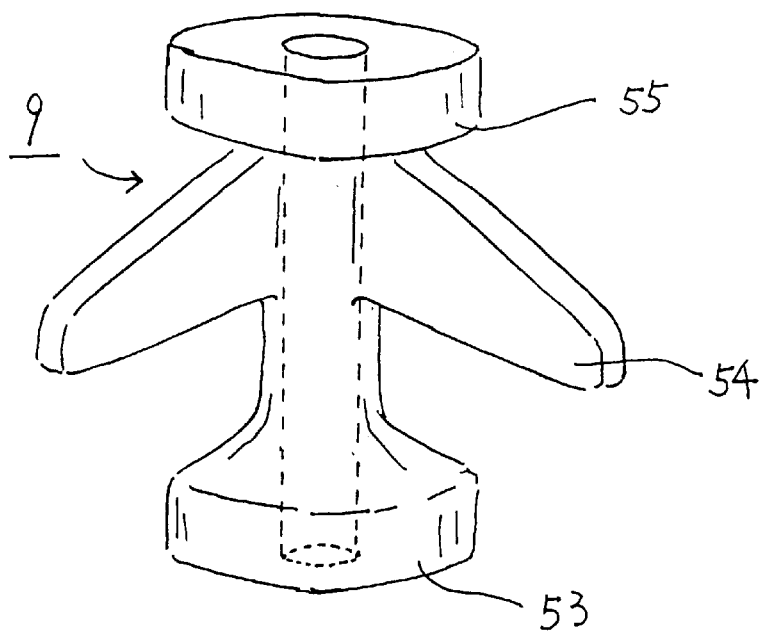
FIG. 5 is a perspective view showing a retainer used in the electromagnetic valve in accordance with the preferred embodiment of the present invention.

FIG. 5 shows the retainer 9 which is configured into a predetermined cylindrical shape with three parts of first projection 53, central projection 54, and second projection 55. The retainer 9 is made of the same material used for the solenoid shaft 5. The retainer 9 and the solenoid shaft 5 are integrally formed. The first projection 53 is integrally formed around the front axial end of retainer 9. The central portion (including circular ridges 47 and 48) of valve member 6 is sandwiched or firmly held between the first projection 53 of retainer 9 and the thickened portion 45 of washer 8. The first projection 53 has a conical shape with a flat front surface extending perpendicularly to the axial direction of the retainer 9. The flat front surface of first projection 53 of retainer 9 provides surface contact between the valve member 6 and the retainer 9.

Figure 6:
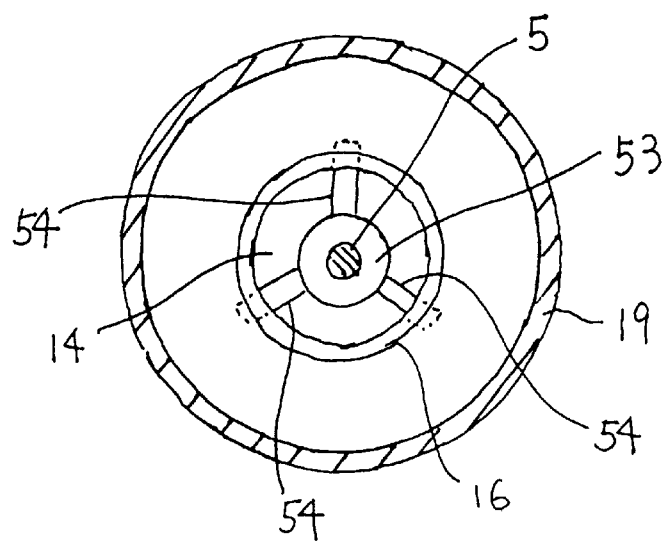
FIG. 6 is a transverse cross-section view, taken along a line V—V of FIG. 1, showing the positional relationship between the retainer and the valve opening in accordance with the preferred embodiment of the present invention.

The central projection 54 is integrally formed around a mid axial portion of the retainer 9. As shown in FIG. 1, the central projection 54 of retainer 9 is brought into contact with the stopper 15 formed on the rear (i.e., upper) surface of partition wall 13 extending perpendicularly to the solenoid shaft 5, when the solenoid valve 1 is in its opened state. The central projection 54 includes three triangular legs having the same shape and angularly spaced from each other at equal intervals of, for example, 120° (refer to FIG. 6). All of the three legs of central projection 54 have main faces aligned parallel to the direction of fluid flow (i.e., air flow). The radially outermost portion of each triangular leg of central projection 54 meets the stopper 15 formed on the rear (i.e., upper) surface of partition wall 13. In other words, when the solenoid valve 1 is in its opened state, the mid axial part of solenoid shaft 5 is supported stably at three points (i.e., corresponding to the outermost portions of respective legs of central projection 54). This effectively prevents the solenoid shaft 5 from tilting with respect to the axial direction of the valve body 2. When the central projection 54 lands on the stopper 15, the central projection 54 forms three sectoral openings within the valve opening 14 (refer to FIG. 6). Each sectoral opening is formed between two of the three triangular legs of central projection 54. When projected on a plane including the valve opening 14, the legs of central projection 54 occupy a relatively small part of the entire area of valve opening 14. Thus, the legs of central projection 54 do not substantially reduce an effective opening area of the valve opening 14. The fluid (air) can smoothly flow from the first fluid passage 11 to the second fluid passage 12 or vice versa. The second projection 55 is integrally formed around the rear axial end of retainer 9.

The second projection 55 is configured into a disk-like flange having a flat rear end surface extending perpendicularly to the axial direction of the retainer 9. The flat rear end surface of second projection 55 provides surface contact between the diaphragm 7 and the retainer 9. The thickened central portion 7a of diaphragm 7 is sandwiched or firmly held between the front end surface of moving core 4 and the rear end surface of second projection 55 of retainer 9.

As best understood with reference to FIG. 4, an air orifice 56 is formed between an outer circumferential wall of plate magnetic 36 and an inner cylindrical wall of coil bobbin 33. An air passage 57 is formed between the rear end surface of the flange portion of plate magnetic 36 and a front end surface of resin molded member 39. The air orifice 56 communicates with the air hole 18 via the air passage 57. An effective cross-sectional area of the air orifice 56 is smaller than that of the air passage 57 or the air hole 18. For example, the air orifice 56 has a width or size of, for example, 0.8 mm. The air passage 57 has a width or size of, for example, 3 mm. The air orifice 56 allows a low-rate flow of air in the air passage 57. Air is slowly introduced into or discharged out of the accommodation chamber 10 via the air orifice 56 and the air passage 57.

As shown in FIG. 4, the accommodation chamber 10 includes two, first and second, sub chambers 75 and 76 partitioned by the moving more 4. The first sub chamber 75 is defined by the diaphragm 7, the moving core 4, and the plate magnetic 36. The first sub chamber 75 is referred to as diaphragm chamber. The second sub chamber 76 is defined by the inner cylindrical surface of coil bobbin 33, the conical recess of stator core 35, the tapered projected end of moving core 4, and an upper end of the cylindrical portion of plate magnetic 36. The second sub chamber 76 accommodates the return spring 37. The second sub chamber 76 is referred to as the spring chamber. An appropriate clearance 77 is provided between the outer cylindrical surface of moving core 4 and the inner surface of cylindrical portion of plate magnetic 36 to allow smooth or frictionless axial slide movement of the moving core 4 relative to the plate magnetic 36. The clearance 77 between the moving core 4 and the plate magnetic 36 also provides connection between the first sub chamber 75 and the second sub chamber 76. The effective cross-sectional area of the clearance 77 is smaller than that of the air orifice 56.

Assembling Method of this Embodiment

Next, the assembling method for the solenoid valve 1 will be explained with reference to FIGS. 1 and 2.

First, the washer 8 and the valve member 6 are successively coupled around the solenoid shaft 5 from the rear axial end of solenoid shaft 5. In other words, the rear axial end of solenoid shaft 5 is inserted into an engagement hole of washer 8 and an engagement hole of valve member 6. Then, the washer 8 and the valve member 6 are shifted in the axial direction along the outer cylindrical surface of solenoid shaft 5 until they reach the front axial end of solenoid shaft 5. The washer 8 is stopped by the flange 51 of solenoid shaft 5. The central portion 6a of valve member 6 is engaged with the thickened portion 45 of washer 8, thereby installing the washer 8 and the valve member 6 around the front axial end of solenoid shaft 5. This is referred to as first assembling step.

Next, the solenoid shaft 5 is combined with the second tubular member 19 in such a manner that the rear axial end of solenoid shaft 5 is inserted into the valve opening 14 of the partition wall 13. This is referred to as second assembling step.

Next, the retainer 9 is coupled around the solenoid shaft 5 from the rear axial end of solenoid shaft 5. In other words, the rear axial end of solenoid shaft 5 is inserted into an engagement hole of retainer 9. Then, the retainer 9 is shifted toward the front axial end of solenoid shaft 5. The first projection 53 coupled around and shifted along the solenoid shaft 5, i.e., the leading side of retainer 9, reaches and abuts the valve member 6. The central portion 6a of valve member 6 is sandwiched or firmly held between the washer 8 and the first projection 53 of retainer 9, thereby sealing the clearance between the solenoid shaft 5 and valve member 6. This is referred to as third assembling step.

Next, the central portion 7a of diaphragm 7 is coupled around the solenoid shaft 5 from the rear axial end of solenoid shaft 5. In other words, the rear axial end of solenoid shaft 5 is inserted into an engagement hole of the central portion 7a of diaphragm 7. Then, the central portion 7a of diaphragm 7 is shifted along the cylindrical surface of solenoid shaft 5 toward the second projection 55 coupled around the solenoid shaft 5, i.e., the trailing side of retainer 9. Thus, the diaphragm 7 is installed around the solenoid shaft 5. This is referred to as fourth assembling step.

Next, the moving core 4 and the plate magnetic 36 are coupled around the rear axial end of solenoid shaft 5 from the rear end of solenoid shaft 5. In other words, the rear end of solenoid shaft 5 is inserted into the through hole 44 of moving core 4. The plate magnetic 36 can be assembled with the moving core 4 beforehand or later. The front end surface of moving core 4 abuts the diaphragm 7. The central portion 7a of diaphragm 7 is sandwiched or firmly held between the moving core 4 and the second projection 55 of retainer 9, thereby sealing the clearance between the solenoid shaft 5 and the diaphragm 7. The outer circumferential edge 52 of diaphragm 7 is sandwiched or firmly held between the engagement wall 46 of second tubular member 19 and the flange portion of plate magnetic 36, thereby sealing the clearance between the diaphragm 7 and the valve body 2.
Function of Embodiment Hereinafter, the function of electromagnetic fluid control valve (i.e., solenoid valve) 1 in accordance with the preferred embodiment will be explained hereinafter with reference to FIGS. 1 and 2.

For the purpose of checking the leak of evaporated fuel generated from pipes 94 and 95 communicating with the fuel tank 91, electric power is supplied to the solenoid coil 34 of electromagnetic drive unit 3 via the terminals 40. When electric power is fed to the solenoid coil 34 (i.e., when the solenoid coil 34 is energized), a magnetomotive force is generated. The state of solenoid valve 1 moves out of its fully opened state. The moving core 4 is magnetically drawn or attracted toward the stator core 35 against a resilient force of return spring 37. At this time, the projected axial end (i.e., upper end) of moving core 4 moves into the recessed portion of stator core 35. Then, the solenoid valve 1 falls into its closed state.

The solenoid shaft 5 fixedly supported by the inner cylindrical wall of moving core 4 and the valve member 6 securely attached at the front axial end (i.e., the lower end) of solenoid shaft 5 move upward in the drawing. The valve member 6 is brought into contact with the front (i.e., lower) end of valve seat 16 formed on one end surface (i.e., the lower end surface) of the partition wall 13 of the second tubular member 2. Thus, the valve opening 14 is closed by the valve member 6.

The diaphragm 7 deforms in accordance with the upward movement of the solenoid shaft 5. Contraction of the diaphragm chamber 75 and the spring chamber 76 cooperatively allow the upward movement of the moving core 4, the solenoid shaft 5, and the valve member 6 as well as the deformation of the diaphragm 7.

In this case, to smoothly shift a movable unit consisting of the moving core 4, the solenoid shaft 5, the valve member 6, and the diaphragm 7 in the axially upward direction, it is necessary to discharge the air remaining in the accommodation chamber 10 (i.e., the diaphragm chamber 75 and the spring chamber 76). According to the arrangement of the solenoid valve 1, during the upward shift movement of the moving core 4 from its lowermost position, the residual air of accommodation chamber 10 is discharged out of the valve body 2 via a route of air orifice 56→air passage 57→air hole 18→the water-repellent filter 71. A cross-sectional area of the air orifice 56 is fairly small compared with each cross-sectional area of the air passage 57 and the air hole 18. Due to the presence of air orifice 56, the residual air of accommodation chamber 10 slowly exits or goes out of the valve body 2. In other words, the pressure decreasing rate in the accommodation chamber 10 is very small. A rate of pressure drop in the spring chamber 76 is relatively low. As the diaphragm 7 deforms, air is drawn from the diaphragm chamber 75 into the spring chamber 76 through the clearance 77. The rate of air flow from the diaphragm chamber 75 into the spring chamber 76 is limited by the clearance 77. The effective cross-sectional area of clearance 77 is smaller than that of air orifice 56. Therefore, air very slowly exits or goes out of the diaphragm chamber 75. The rate of pressure drop in the diaphragm chamber 75 can be lower than that in the spring chamber 76. Thus, air is discharged from the accommodation chamber 10 at a low rate. The inside pressure of accommodation chamber 10 becomes lower than the pressure of the first fluid passage 11.

The diaphragm 7 slowly deforms and shifts in the axially upward direction from its lowermost position. The central portion 7a of diaphragm 7 is thicker and less deformable than the easily deformable portion 7b of diaphragm 7 which extends around the central portion 7a. Accordingly, the central portion 7a of diaphragm 7 slowly shifts in the axially upward direction without causing substantial elastic deformation. The moving core 4, the solenoid shaft 5, and the valve member 6 slowly move upward. The rear axial portion of solenoid shaft 5, when moving in the axial direction, is guided by the diaphragm 7. The valve member 6 is fixed at the front axial end of solenoid shaft 5. When the valve member 6 is brought into contact with the valve seat 16, the valve member 6 slowly or gently contacts the valve seat 16. Thus, it is possible to effectively suppress the level of noise (such as collision sound) generated when the valve member 6 meets the valve seat 16.

After finishing the leak check, the supply of electric power to the solenoid coil 34 is stopped or suspended. The magnetomotive force disappears from the moving core 4 upon stop or suspension of electric power supply to the solenoid coil 34. Accordingly, the moving core 4 is pressed back to the axially lower position by the resilient force of return spring 37. The moving core 4, the solenoid shaft 5, and the valve member 6 move in the axially downward direction in the drawing. The valve member 6 departs from or lift off valve seat 16. The valve opening 14 is opened. In this manner, the solenoid valve 1 is changed from its closed state to its opened state.

During engine operation, a significant negative pressure develops at the portion downstream of the throttle valve in the engine intake passage 93. When the purge valve 97 is opened during such an engine operating condition, the pipe 95 is subjected to the negative pressure. The outside air comes into the canister 92 via a route of first fluid passage 11→valve opening 14→second fluid passage 12→pipe 99. The evaporated fuel residing in the canister 92 is carried or scavenged by the introduced air into the engine intake passage 93 via the pipe 95.

The diaphragm 7 deforms in accordance with the downward movement of the solenoid shaft 5. Expansion of the diaphragm chamber 75 and the spring chamber 76 cooperatively allow the downward movement of the moving core 4, the solenoid shaft 5, and the valve member 6 as well as the deformation of the diaphragm 7. In this case, to smoothly shift the moving core 4, the solenoid shaft 5, the valve member 6, and the diaphragm 7 in the axially downward direction, it is necessary to introduce the air into the accommodation chamber 10 (i.e., the diaphragm chamber 75 and the spring chamber 76). According to the arrangement of the solenoid valve 1, during the downward shift movement of the moving core 4 from its uppermost position, the outside air is introduced into the accommodation chamber 10 via a route of water-repellent filter 71→air hole 18→air passage 57→air orifice 56. The rate of air flow into the spring chamber 76 is limited by the air orifice 56. The outside air slowly enters into the accommodation chamber 10. In other words, the pressure increasing rate in the accommodation chamber 10 is very small. A rate of pressure rise in the spring chamber 76 is relatively low. As the diaphragm 7 deforms, air is drawn from the spring chamber 76 into the diaphragm chamber 75 through the clearance 77. The rate of air flow from the spring chamber 76 into the diaphragm chamber 75 is limited by the clearance 77. The effective cross-sectional area of clearance 77 is smaller than that of air orifice 56. Therefore, air very slowly lows into the diaphragm chamber 75. The rate of pressure rise in the diaphragm chamber 75 can be lower than that in the spring chamber 76. Thus, air is introduced into the accommodation chamber 10 at a low rate so that the diaphragm 7 slowly deforms.

Accordingly, the diaphragm 7 slowly shifts in the axially downward direction. The central portion 7a of diaphragm 7 is thicker and less deformable than the easily deformable portion 7b of diaphragm 7 which extends around the central portion 7a. Therefore, the central portion 7a of diaphragm 7 slowly shifts in the axially downward direction without causing substantial elastic deformation. The moving core 4, the solenoid shaft 5, and the valve member 6 slowly move downward.

The central projection 54 of retainer 9, moving together with the central portion 7a of diaphragm 7, slowly or gently contacts the stopper 15 formed on the rear (i.e., upper) surface of partition wall 13. Thus, it becomes possible to eliminate the collision sound of solenoid shaft 5. The inside pressure of accommodation chamber 10 becomes equal to the pressure of the first fluid passage 11.

When a filler cap 91A of fuel tank 91 is unfastened or loosened for feed of fuel, the outside air enters into the fuel tank 91 via its fuel neck. The air entering in the fuel tank 91 flows into the canister 92 via the pipe 94. The air entering in the canister 92 returns to the outside via a route of pipe 99→second fluid passage 12→valve opening 14→first fluid passage 11.

Effect of Embodiment

As described above, according to the electromagnetic fluid control valve (i.e., solenoid valve) 1 of this embodiment, the valve opening 14 is provided at the center of the partition wall 13 of the second tubular member 19. The solenoid shaft 5 has the flange 51 at the front axial end thereof. The retainer 9 is coupled around the outer cylindrical surface of the mid axial portion of the solenoid shaft 5. The retainer 9 includes the first projection 53 having a conical body with a flat front surface extending perpendicularly to the axial direction of the solenoid shaft 5. The retainer 9 includes the central projection 54 has three triangular wings angularly spaced from each other at equal intervals of, for example, 120°. Each of three wings of the central projection 54 expands toward the radially outward direction. The radially outermost portion of each triangular wing of central projection 54 meets the stopper 15 formed on the rear (i.e., upper) surface of partition wall 13. When the central projection 54 lands on the stopper 15, the central projection 54 forms three sectoral openings within the valve opening 14. Each sectoral opening is formed between two of the three triangular wings of central projection 54, for allowing the fluid (air) to smoothly flow from the first fluid passage 11 to the second fluid passage 12 or vice versa. The retainer 9 includes the second projection 55 having a flange-like body. The first projection 53 is positioned at the front axial portion (i.e., lower portion) of the solenoid shaft 5, while the second projection 55 is positioned at the rear axial portion (i.e., upper portion) of the solenoid shaft 5. The valve member 6 has a disk-shaped body. The central portion 6a of valve member 6 is pressed airtightly between the rear surface of washer 8 and the flat front surface of the first projection 53 of retainer 9. This ensures the sealing between the solenoid shaft 5 and the valve member 6. This provides a simplified and excellent sealing for the solenoid shaft 5 and the valve member 6.

Furthermore, the coaxial circular ridges 47 and 48 are provided at front and rear surfaces of the central portion 6a of valve member 6. When a pressing force is applied to the valve member 6, the pressing force concentrates on these circular ridges 47 and 48. Thus, these circular ridges 47 and 48 deform (cause elastic deformation) while the main body of valve member 6 remains undeformed without causing any warpage.

When the electromagnetic valve is in its closed state, the valve member 6 contacts the valve seat 16 formed on the partition wall 13. The above-described arrangement of the solenoid valve 1 surely prevents the valve leakage at the condition where the valve member 6 is brought into contact with the valve seat 16.

Furthermore, the central portion 7a of diaphragm 7 is pressed airtightly between the front end surface of moving core 4 and the rear surface of the second projection 55 of retainer 9. This ensures the sealing between the solenoid shaft 5 and the diaphragm 7. This provides a simplified and excellent sealing for the solenoid shaft 5 and the diaphragm 7.

According to the manufacturing method of this invention, many of the valve components, i.e., washer 8, valve member 6, retainer 9, diaphragm 7, moving core 4, and magnetic 36, are assembled in the same direction from the rear end of solenoid shaft 5. This improves the efficiency of assembling works and realizes the cost reduction.

According to the above-described arrangement of this invention, the solenoid shaft 5 has a simplified outer configuration. The manufacturing cost of solenoid shaft 5 can be reduced.

Ensuring the sealing between the solenoid shaft 5 and the diaphragm 7 leads to airtight sealing between the accommodation chamber 10 and the first and second fluid passages 11 and 12. Accordingly, the electromagnetic drive unit 3, the plate magnetic 36, and the moving core 4 is not subjected to the water or other foreign substances contained in the air. This effectively suppresses the short-circuit of electric conductive members, such as solenoid coil 34. Generation of rust or stain will be also suppressed. Accordingly, the moving core 4 can smoothly slide along the cylindrical wall of the plate magnetic 36. In other words, it is possible to prevent the defective slide between the plate magnetic 36 and the moving core 4 which might be caused by water or other foreign substances.

Furthermore, the solenoid valve 1 of the present invention provides the following advantages. During the change of solenoid valve 1 to its closed state, the valve member 6 gently contacts the valve seat 16 while the pressure balance between the fluid passage 11 and the accommodation chamber 10 is suitably adjusted. Therefore, it is possible to suppress the level of noise when the valve member 6 meets the valve seat 16. During the change of solenoid valve 1 to its opened state, the central projection 54 of retainer 9 gently contacts the stopper 15 formed on the rear (i.e., upper) surface of partition wall 13 while the pressure balance between the fluid passage 11 and the accommodation chamber 10 is suitably adjusted. Therefore, it is possible to suppress the level of noise when the central projection 54 meets the stopper 15.

The central portion 7a of diaphragm 7 is securely attached to the solenoid shaft 5. The central portion 7a of diaphragm 7 is less deformable than the easily deformable portion 7b of diaphragm 7 which extends around the center portion 7a. The moving core 4 is supported by the diaphragm 7. The rigid center central portion 7a of diaphragm 7 prevents unwanted deformation of the diaphragm 7 while suitably maintaining the pressure balance between the fluid passage 11 and the accommodation chamber 10.

Modification of Embodiment

First Modification

A first modification of the present invention is similar to the above-described preferred embodiment of the present invention except for a minor change indicated below.

Application of the electromagnetic fluid control valve explained in the above-described preferred embodiment is not limited to the evaporated fuel purge system of an automotive vehicle. In this respect, the electromagnetic fluid control valve (i.e., solenoid valve 1) in the first modification of this invention is applied to other devices, such as engine accessories and air-conditioner, installed in an automotive vehicle.

Second Modification

A second modification of the present invention is similar to the above-described preferred embodiment of the present invention except for a minor change indicated below.

From the purpose of the invention, the controlled fluid is not limited to the air. In this respect, the electromagnetic fluid control valve (i.e., solenoid valve 1) in the second modification of this invention is applied to control a gaseous-phase coolant or other gas, water or liquid-phase coolant or other liquid, or a gas-liquid two-phase fluid.

Third Modification

A third modification of the present invention is similar to the above-described preferred embodiment of the present invention except for a minor change indicated below.

In a solenoid valve 1 of the third modification, a cushion rubber is attached to the central projection 54 of retainer 9, at least to a portion where the central projection 54 contacts the stopper 15 formed on the partition wall 13. This assures that the level of noise is further suppressed when the central projection 54 meets the stopper 15.

Fourth Modification

A fourth modification of the present invention is similar to the above-described preferred embodiment of the present invention except for a minor change indicated below.

In a solenoid valve 1 of the fourth modification, the number of the legs of central projection 54 of retainer 9 is other than three. The number of the legs of central projection 54 can be reduced to, for example, two. In this case, it is possible to reduce the loss of air (fluid) flow caused by these legs when the central projection 54 lands on the stopper 15. On the contrary, the number of the legs of central projection 54 can be increased to, for example, four. In this case, it is possible to stabilize the landing of the legs of central projection 54 on the stopper 15.

Fifth Modification

A fifth modification of the present invention is similar to the above-described preferred embodiment of the present invention except for a minor change indicated below.

In a solenoid valve 1 of the fifth modification, the shape of the legs of central projection 54 can be modified in various ways. For example, the shape of the legs of central projection 54 are rectangular, polar, ring-like, circular, elliptic, or any other one, or a combination of them.

Sixth Modification

A sixth modification of the present invention is similar to the above-described preferred embodiment of the present invention except for a minor change indicated below.

In a solenoid valve 1 of the sixth modification, the shape of the first projection 53 and the second projection 55 of retainer 9 can be modified in various ways. For example, the shape of first projection 53 is flange-like while the shape of second projection 55 is conical. The flat surface of respective projections 53 and 55 is not limited to a circular one, and may be rectangular, polar, ring-like, elliptic or any other one as long as the flat surfaces of respective projections 53 and 55 provide sufficient surface contact.

What is claimed is:

1. An electromagnetic fluid control valve comprising:

an electromagnetic actuator having a movable member slidable in an axial direction of said electromagnetic fluid control valve;

a valve body having an accommodation chamber storing said electromagnetic actuator therein, a fluid passage in which fluid flows, and a valve opening formed in an appropriate portion of said fluid passage;

a diaphragm airtightly separating an inside space of said valve body into said fluid passage and said accommodation chamber;

a shaft extending in the axial direction through said valve opening and being integrally shiftable with said movable member in the axial direction, said shaft having a flange at one axial end thereof which is capable of passing through said valve opening;

a valve member coupled around said shaft at said one axial end for closing said valve opening when said valve member is brought into contact with a valve seat formed around said valve opening and for opening said valve opening when said valve member lifts off said valve seat;

a retainer coupled around said shaft at a portion axially offset from said valve member, said retainer being capable of passing through said valve opening;

a first retaining portion provided at one axial end of said retainer, with said valve member sandwiched between said flange of said shaft and said first retaining portion of said retainer; and a second retaining portion provided at the other axial end of said retainer, with said diaphragm sandwiched between said movable member of said electromagnetic actuator and said second retaining portion of said retainer.

2. The electromagnetic fluid control valve in accordance with claim 1, wherein said valve member has at least one ring-shaped projected portion provided on an end surface thereof, and said ring-shaped projected portion is deformed when a pressing force is applied between said flange of said shaft and said first retaining portion of said retainer.

3. The electromagnetic fluid control valve in accordance with claim 2, wherein said at least one ring-shaped projected portion is provided on both end surfaces of said valve member.

4. The electromagnetic fluid control valve in accordance with claim 2, wherein said valve member has two circular ridges as said at least one ring-shaped projected portion.

5. The electromagnetic fluid control valve in accordance with claim 1, wherein said valve body has a stopper for restricting an excessive shift movement of said shaft in the axial direction when said electromagnetic valve is in an opened state.

6. The electromagnetic fluid control valve in accordance with claim 5, wherein said stopper is formed on a partition wall protruding radially inward from a tubular wall of said valve body for separating said fluid passage into two passages.

7. The electromagnetic fluid control valve in accordance with claim 6, wherein an inner circular edge of said partition wall defines said valve opening.

8. The electromagnetic fluid control valve in accordance with claim 5, wherein said retainer has a central projection formed between said first retaining portion and said second retaining portion, and said central projection is brought into contact with said stopper of said valve body when said electromagnetic valve is in an opened state.

9. The electromagnetic fluid control valve in accordance with claim 8, wherein said central projection of said retainer includes a plurality of legs extending in radially outward directions from a main body of said retainer.

10. The electromagnetic fluid control valve in accordance with claim 1, wherein said first retaining portion has a flat surface extending perpendicularly to the axial direction for providing surface contact between said valve member and said retainer.

11. The electromagnetic fluid control valve in accordance with claim 1, wherein said second retaining portion has a flat surface extending perpendicularly to the axial direction for providing surface contact between said diaphragm and said retainer.

12. The electromagnetic fluid control valve in accordance with claim 1, further comprising a communication passage for providing connection between said accommodation chamber and the outside of said valve body.

13. The electromagnetic fluid control valve in accordance with claim 12, wherein said communication passage includes an orifice which substantially restricts a flow rate of fluid in said communication passage.

14. The electromagnetic fluid control valve in accordance with claim 1, wherein said diaphragm has a central portion and an easily deformable portion extending around said central portion, and said central portion has a higher rigidity than said easily deformable portion.

15. The electromagnetic fluid control valve in accordance with claim 14, wherein said central portion of said diaphragm is coupled around the solenoid shaft.

16. The electromagnetic fluid control valve in accordance with claim 14, wherein said central portion of said diaphragm is thicker than said easily deformable portion extending around said central portion.

17. A method for assembling an electromagnetic fluid control valve, said electromagnetic valve comprising:
an electromagnetic actuator having a movable member slidable in an axial direction of said electromagnetic fluid control valve;
a valve body having an accommodation chamber storing said electromagnetic actuator, a fluid passage in which fluid flows, and a valve opening formed in at an appropriate portion of said fluid passage;
a diaphragm airtightly separating an inside space of said valve body into said fluid passage and said accommodation chamber;
a shaft extending in the axial direction through said valve opening and being integrally shiftable with said movable member in the axial direction, said shaft having a flange at one axial end thereof which is capable of passing through said valve opening;
a valve member coupled around said shaft at said one axial end for closing said valve opening when said valve member is brought into contact with a valve seat formed around said valve opening and for opening said valve opening when said valve member lifts off said valve seat;
a retainer coupled around said shaft at a portion axially offset from said valve member, said retainer being capable of passing through said valve opening;
a first retaining portion provided at one axial end of said retainer, with said valve member sandwiched between said flange of said shaft and said first retaining portion of said retainer; and
a second retaining portion provided at the other axial end of said retainer, with said diaphragm sandwiched between said movable member of said electromagnetic actuator and said second retaining portion of said retainer, said assembling method comprising:
a first step of coupling said valve member around one axial end of said shaft by inserting said other axial end of said shaft into an engagement hole of said valve member;
a second step of combining said valve body with said shaft by inserting said other axial end of said shaft into said valve opening of said valve body so that said shaft extends through said valve opening of said valve body;
a third step of coupling said retainer around said shaft by inserting said other axial end of said shaft into an engagement hole of said retainer;
a fourth step of coupling said diaphragm around said shaft by inserting said other axial end of said shaft into an engagement hole of said diaphragm; and
a fifth step of coupling said movable member of said electromagnetic actuator around the other axial end of said shaft by inserting said other axial end of said shaft into an engagement hole of said movable member.

* * * * *

UNITED STATES PATENT AND TRADEMARK OFFICE
CERTIFICATE OF CORRECTION

PATENT NO.   : 6,672,562 B2
DATED        : January 6, 2004
INVENTOR(S)  : Kato Yasuo It is certified that error appears in the above-identified patent and that said Letters Patent is hereby corrected as shown below:

Title page,
Item [65], insert:
   -- Foreign Application Priority Data
February 8, 2001 (JP) ………….. 2001-31777 --

Signed and Sealed this

Thirtieth Day of March, 2004

JON W. DUDAS
*Acting Director of the United States Patent and Trademark Office*